F. H. FABIAN.
BAIL ATTACHMENT.
APPLICATION FILED JAN. 31, 1914.
1,199,680.
Patented Sept. 26, 1916.
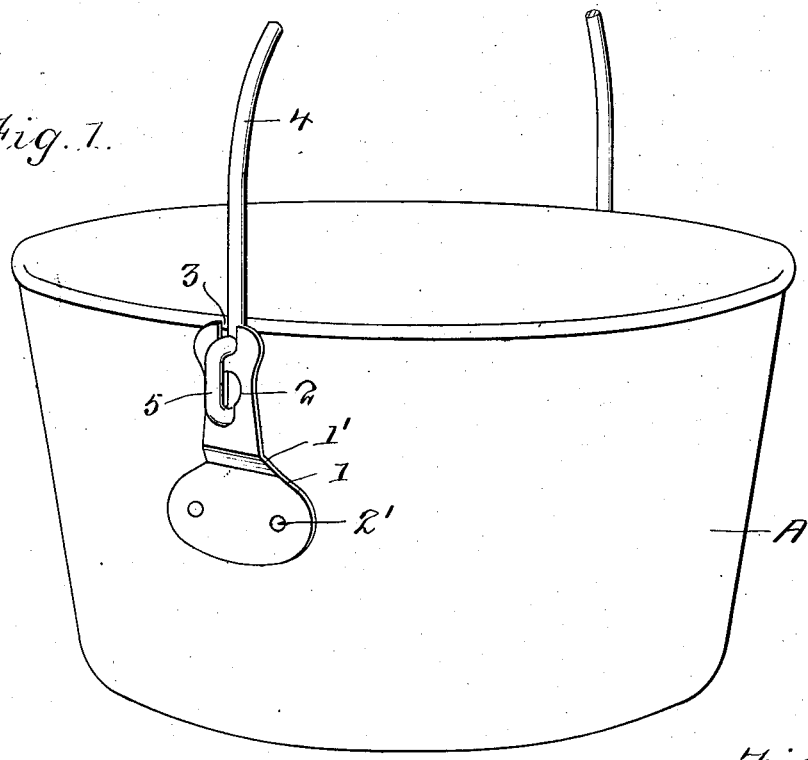
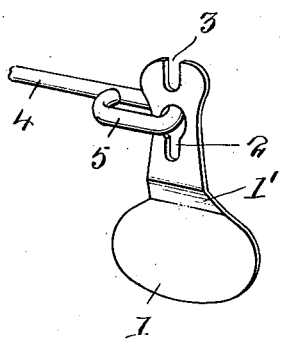
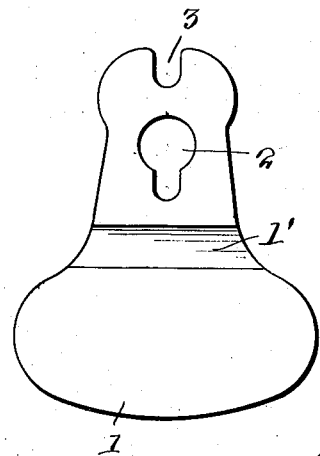
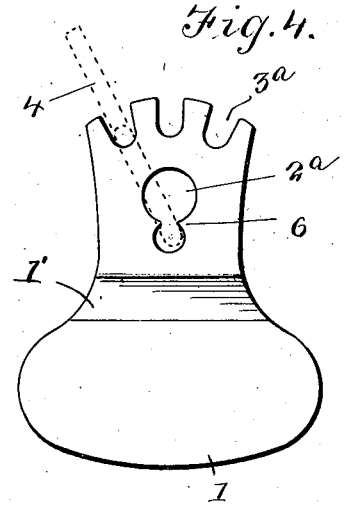
Inventor
Frederick H. Fabian

UNITED STATES PATENT OFFICE.

FREDERICK H. FABIAN, OF NEW YORK, N. Y.

BAIL ATTACHMENT.

1,199,680.  Specification of Letters Patent.  Patented Sept. 26, 1916.

Application filed January 31, 1914. Serial No. 815,721.

*To all whom it may concern:*

Be it known that I, FREDERICK H. FABIAN, a citizen of the United States, residing at New York, in the county of New York and State of New York, have invented new and useful Improvemeents in Bail Attachments, of which the following is a specification.

The invention has relation to kitchen utensils provided with bails such as tea-kettles, pots and the like, the purpose being to provide a joint between the bail and utensil which will hold the bail in vertical position and prevent a heating thereof to such an extent as to burn the hand and cause a dropping of the utensil and a spilling of the contents thereof.

The invention provides a connection between the bail and body of the utensil which will admit of the bail swinging freely in the usual manner or being held in upright position to prevent overheating so that the bail may be grasped at any time without producing a shock such as experienced by grasping a bail heated to a degree to burn the fingers.

The invention consists of the novel features, details of construction and combination of parts, which will be hereinafter more particularly set forth, illustrated and claimed.

In the drawing:—

Figure 1 is a perspective view of a pot showing the bail connected thereto by means embodying the invention, the bail being held in vertical position. Fig. 2 is a view of the parts illustrated in Fig. 1 with the bail swung downward. Fig. 3 is a detail view of the ear. Fig. 4 is a modification.

Corresponding and like parts are referred to in the following description, and indicated in all the views of the drawing, by the same reference characters.

In the drawing there has been shown a kettle A to each side of which is applied an ear 1, said ear being secured by means of fastening members 2'. The ears at the two sides of the kettle are identical and only one of said ears appears in Fig. 1. The ear is formed intermediate its upper and lower ends with an offset 1' whereby the upper end portion of the ear is offset outwardly with respect to the side wall of the kettle, the ear being secured in such a position that the upper extremity of the ear is approximately in a horizontal plane of the rim or top edge of the kettle. That portion of the ear which is above the offset 1' is formed with a keyhole slot 2 and with a notch 3, the key-hole slot being arranged with its eye uppermost. The notch 3 is at the top edge of the ear and in vertical line with the key-hole slot, and in conjunction with the lower contracted end of the key-hole slot 2 holds the bail 4 in upright position. The bail 4 is provided at each of its ends with an elongated eye 5 which is looped into the key-hole slot 2 of an ear. The eye 5 is of such a length with reference to the notch 3 and key-hole slot 2 that when the bail is in vertical position the lower end of the eye rests in the lower end of the key-hole slot 2 and the upper end of the eye enters the notch 3 with a result that the bail is held in vertical position as indicated in Fig. 1. That portion of the bail which is bent to form the eye 5 is included between the side wall of the kettle and the outwardly offset upper end portion of the ear, being thereby guided and retained in such a manner as to make accidental disengagement of the parts unlikely or impossible. When it is required to swing the bail into lowered position so as to be out of the way the bail is moved upward to disengage the upper ends of the eyes 5 from the notches 3 after which the bail may be swung into lowered position either to the right or to the left as indicated in Fig. 2.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

In the modification shown in Fig. 4 the ear 1 is formed in its upper edge with a plurality of notches $3^a$ and in its upper portion with a vertical elongated opening $2^a$ the end portions of which are rounding and of different diameters, the lower one being smaller thereby providing inner extensions 6 which are adapted to project over the lower member of the eye 5 to prevent vertical displacement thereof when the bail 4 is inclined as indicated by the dotted lines. This construction provides for convenient access to the pot or utensil without requiring the dropping of the bail and the heating of the same.

Having thus described my invention, what I claim as new, is:—

1. The combination with a kettle having a substantially vertical side wall, of an ear secured externally on such side wall with its upper end portion approximately in the plane of the top edge of the kettle, said ear having intermediate the upper end lower ends thereof an offset whereby the upper end portion is offset outwardly with respect to the wall of the kettle, said outwardly offset portion having a keyhole slot, the constricted portion of which extends downwardly, and provided with a notch in its upper edge, in combination with a bail having an eye engaging the keyhole slot and capable also of engaging the notch, the portion of the bail having said eye lying between and in frictional engagement with the wall of the kettle and the upper end portion of the ear, the offset of the ear being of a width substantially equal to the thickness of the bail.

2. In a device of the class described, an ear member having an offset intermediate its upper and lower ends whereby the upper and lower end portions are disposed in different vertical planes, said upper end portion having a plurality of notches in its upper edge, and said upper end portion having also a slot of substantially keyhole shape with rounded upper and lower portions of different diameters whereby extensions or projections 6 are produced, in combination with a bail having an eye engaging the slot and capable also of engaging any one of the notches at the upper edge of the ear.

In testimony whereof I affix my signature in presence of two witnesses.

FREDERICK H. FABIAN.

Witnesses:
    HENRY GRUEN,
    CHARLES P. DIETZ.